Aug. 1, 1967 A. H. REUTHER 3,333,531

COMBINATION DOMESTIC APPLIANCE

Filed Oct. 11, 1965

INVENTOR.

Albert H. Reuther

United States Patent Office 3,333,531
Patented Aug. 1, 1967

3,333,531
COMBINATION DOMESTIC APPLIANCE
Albert H. Reuther, Dayton, Ohio, assignor to General Motors Corporation, Detroit, Mich., a corporation of Delaware
Filed Oct. 11, 1965, Ser. No. 494,637
The entire term of the patent has been dedicated to the Public
20 Claims. (Cl. 99—339)

This invention relates to domestic appliances, and more particularly, to a combination toaster and self-cleaning oven means.

Modern homes have facilities to increase convenience and save time for homemakers in various ways. Yet there are matters which require attention with effort that is reduced further in accordance with the present invention. Also, in some instances, there are space limitations for placement of various electrically operated appliances. Establishment of households involves a certain amount of saving if possible in meeting need for cost, time and work reduction though affording a maximum availability of appliance service. Accordingly, an object of the present invention is to provide a new and improved combination toaster and self-cleaning oven means having features that are available for use to meet various needs and provide overall savings as to the various aspects noted.

Another object of this invention is to provide an electric toaster portion in combination with an electric range including a cooking top with predetermined openings as well as burners having location adjacent to built-in electrically energizable heating elements to one side of toaster access openings. The built-in toaster portion further has location to one side of a self-cleaning oven portion of the range with a movable insulated segment forming at least a portion of chute means actuated to release consumable material such as crumbs, bread particles and burned crust from the toaster portion into the self-cleaning oven portion in which such consumable material is reduced into a disintegrating ash during high temperature electric oven cleaning.

Another object of this invention is to provide combination toaster and self-cleaning oven means in which a remote-controlled linkage effects bottom opening of a toaster portion and drop of consumable material from the bottom area of the toaster portion through a step segmented oven insulating portion. The linkage has a control knob located to one side of and behind peripheral edging of oven door means. Closure of the door means with safety interlock during electric oven cleaning operation simultaneously requires linkage positioning to shut the oven insulation access from the toaster portion followed by electric oven cleaning operation which includes disintegration of toaster portion crumbs and/or particles.

A further object of this invention is to provide a push-pull slide and louver control as well as simultaneous pivotal displacement of an insulated segment of a self-cleaning oven means in combination with a multi-slot electric toaster portion. The louver control in one position forms a temporary bottom or floor for the toaster portion from which consumable particles, crumbs and the like drop through a chute or passage formed by pivotal temporary displacement of a corner insulated segment as a trap door below the toaster portion in combination with the self-cleaning oven.

Another object of this invention is to provide a built-in electric toaster portion in combination with an electrical self-cleaning oven having access opening thereto as well as safety interlock door latching. An actuator for remotely opening and closing passage between the toaster portion and oven has mechanical linkage which must be shifted to closed positioning of a movable insulating segment that both complements self-cleaning oven insulation jacket structure and also is complementary to toaster portion location. The toaster portion has external access openings adjacent to a console control portion including self-cleaning oven door latch and temperature setting knob means.

Further objects and advantages of the present invention will be apparent from the following description, reference being had to the accompanying drawings wherein preferred embodiments of the present invention are clearly shown.

Figure 1:
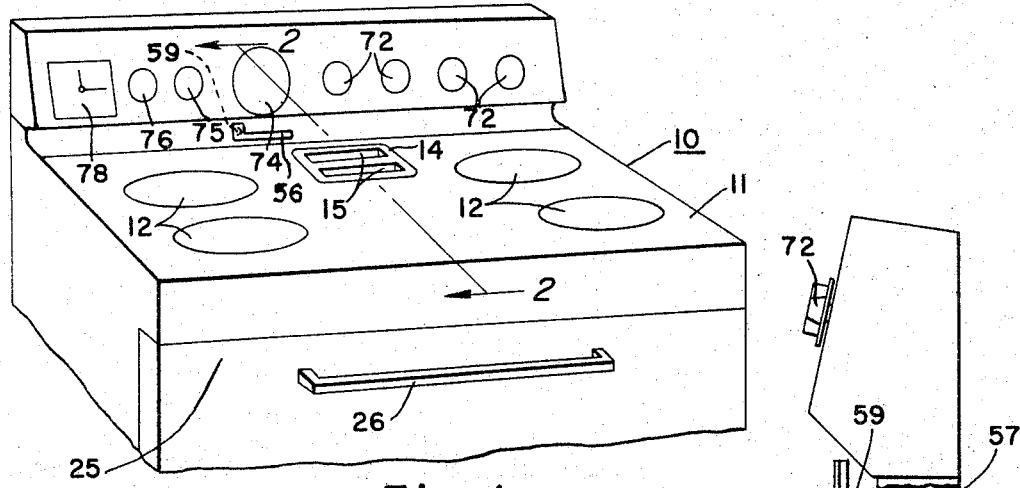
FIGURE 1 is a frontal plan view of combination toaster and self-cleaning oven means in accordance with the present invention.

In FIGURE 1 a combination domestic appliance generally indicated by numeral 10 is shown including a cooking top portion 11 provided with a plurality of electric burner opening means 12 in a well known manner. An example of burner means for use in such locations is found in disclosure of Patent 3,116,397—Clark, issued Dec. 31, 1963, to the assignee of the present invention for a thermally responsive control device for surface cooking units. Also a Patent 3,167,638—Hornaday et al., issued Jan. 26, 1965, to the assignee of the present invention shows features of a surface cooking unit.

Figure 2:
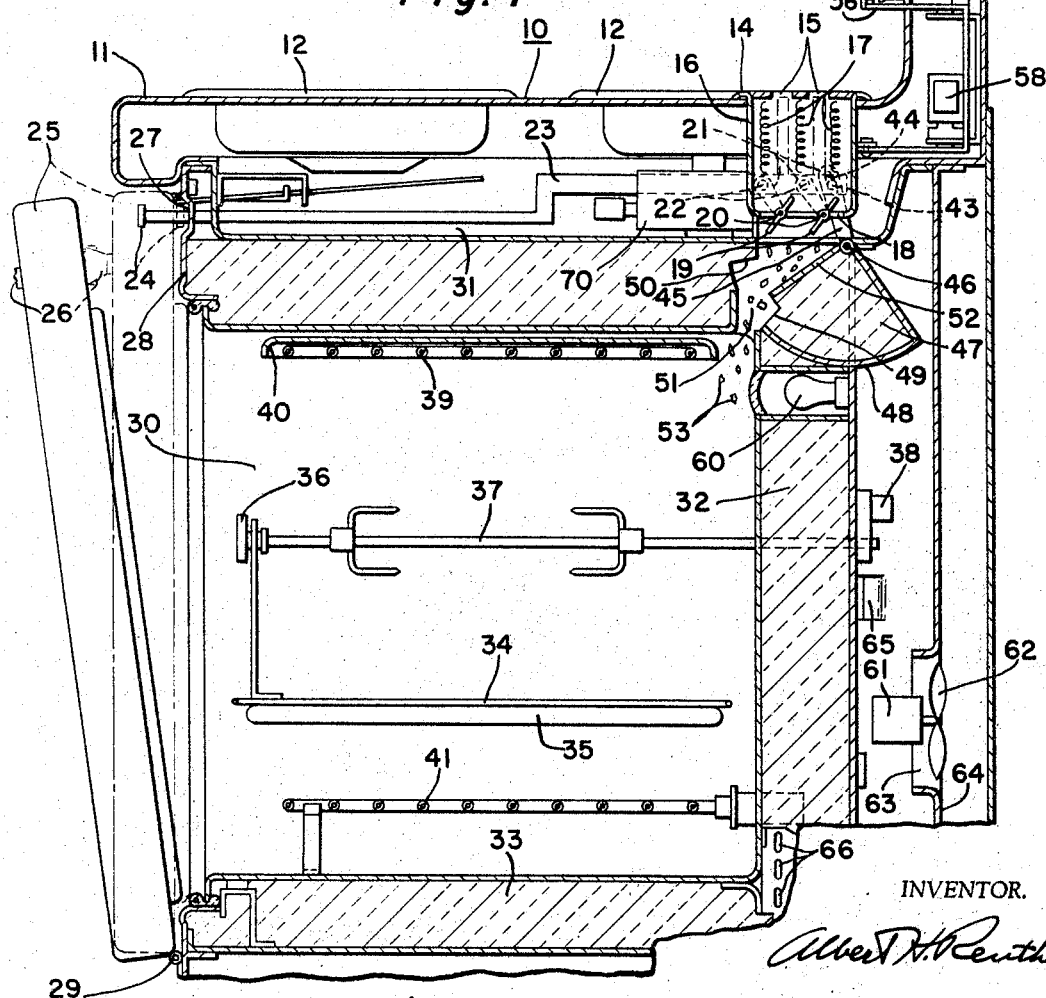
FIGURE 2 is a fragmentary cross-sectioned elevational view of combination toaster and self-cleaning oven means taken along line 2—2 in FIGURE 1.

The combination domestic appliance 10 further includes a toaster portion 14 having at least a pair of slots or access apertures 15 provided in combination with the cooking top portion 11 and additional features below top surface thereof as shown in FIGURE 2 of the drawings. The toaster portion 14 has a substantially box-like housing 16 in which a plurality of heating elements 17 are suitably mounted. It is to be understood that the toaster portion 14 including the heater elements 17 is electrically operable from a suitable source of power used to energize the electric burners of the combination domestic appliance 10 as well as oven features subsequently disclosed herein. Reference is made to Patents 2,197,221—Koci, dated Apr. 16, 1940; 2,459,169—Koci, dated Jan. 18, 1949; and 2,459,170—Koci, dated Jan. 18, 1949, for examples of toaster control mechanism as well as thermostat control and heating element structure per se in further detail.

In accordance with the present invention, the toaster portion 14 including housing 16 has a bottom opening 18 closable by pivotal movement of louver means 19. Each louver means 19 has a pivot axis or shaft 20 to which there is secured a lever 21 extending rigidly and laterally upwardly. Each lever arm 21 is fixed as to shaft means 20 in a location externally of the toaster housing portion 16. Upper ends of the lever arms 21 have a pin or pivot connection 22 directly to a push-pull actuator or plunger means 23 having a knob end 24. The knob end 24 as well as a portion of the actuator or plunger means 23 will be movable to and fro in a location substantially parallel to as well as below the cooking surface portion 11. An oven door means 25 with a handle portion 26 has an upper end peripheral edging thereof located in front of the knob 24 which when pushed inwardly fits complementary to a recess 27 adjacent to aperturing for the actuator passage in a frame portion or support 28. It is noted that the knob end 24 fits complementary in the recessing 27 between the support 28 and upper peripheral edging 25 of the oven door means. The oven door means 25 at a lower end thereof has a suitable pivot or hinge connection 29 as represented in FIGURE 2. The oven door means 25 thus is pivotally movable into open and closed positioning relative to an oven chamber 30. It is to be understood that the oven door means 25 has suitable insulation packing and the oven chamber 30 includes an insulated top wall portion 31, an insulated rear wall portion 32 as well as an insulated bottom portion 33 and correspondingly insulated side walls. Optionally there are removable shelves 34 slidably positioned on embossments 35 on opposite sides of the oven liner means. A rotatable spit 36 having a shaft 37 rotatably driven by a rotisserie motor means 38 can also be provided within the oven chamber 30.

Heating within the oven liner means is provided by a broil heating element 39 carried in a reflector 40 in a location adjacent to the top of the oven chamber 30 and by a bake heating element 41 adjacent to a bottom area of the oven chamber. Reference is made to a Patent 2,821,903, Allen Jr. et al. issued Feb. 4, 1958, concerning rotisserie operation.

Broiling operation of the oven chamber in the combination domestic appliance means 10 or range having features in accordance with the present invention occurs electrically as does the baking and cooking burner operation also. Reference is made to teachings of Fry Patents 2,790,056 and 2,828,399 issued Apr. 23, 1957, and Mar. 25, 1958, respectively as to broiling operation. For more detailed explanation of variable resistance temperature sensing system for an oven, reference may be made to Baker Patent 2,962,575 issued Nov. 29, 1960, which is representative of such a temperature controller commercially available from the King-Seeley Thermos Company.

In accordance with the present invention, the actuator or plunger means 23 at an end thereof adjacent to the toaster portion is provided with a transverse bar or pin 43 which is complementary to a slot or lost motion connection 44 at one end of an arm 45 secured to a shaft or pivot means 46. The shaft or pivot means 46 is suitably journalled as to the oven liner housing structure and an insulated segment 47 of this oven liner means has an arcuate or triangular-like portion 48 adjacent to a step or mating abutment portion 49 thereof. This step portion 49 is complementary to a corner 50 of the oven liner means when the actuator or plunger means 23 is pushed inwardly into a retracted positioning whereby the lever arm 45 effects pivotal movement of the insulated segment 47 to close off a chute or passage forming portion 51. Simultaneously with retraction of the actuator or plunger means 23, the segment 47 has a top portion 52 which is horizontally positioned below corresponding horizontal and parallel positioning of the louver means 19 of the toaster portion. In accordance with the present invention, when the actuator knob 24 is pulled outwardly after opening of the oven door means 25, the louver means 19 are opened and simultaneously the insulated segment 47 is pivoted downwardly and rearwardly such that the top portion 52 and step 49 thereof adjacent to the passage or chute portion 51 permit dropping of crumbs, burned crust, and/or bread particles 53 representing consumable material that drops into the oven chamber 30. Such push-pull actuation of the plunger means 23 is effected by a homemaker or range operator whenever deemed necessary and prior to operation of the combination electric self-cleaning oven control means. Such self-cleaning oven control means include a movable latch handle means 56 to actuate a latch solenoid switch means 57 as to a door switch 58. Latch mechanism for accomplishing this safety closure of the oven door means 25 is described more fully in a copending application S.N. 391,559—Martin et al., filed Aug. 24, 1964, on a control system for a self-cleaning oven means belonging to the assignee of the present invention. A control-panel knob means 59 is movable into stop, cook and clean positions. An electric self-cleaning oven temperature control method using low voltage thermal relays suitable for operation of the self-cleaning oven portion of the range or combination domestic appliance 10 is disclosed by a copending application S.N. 402,803, Alexander, filed Oct. 9, 1964, belonging to the assignee of the present invention. In accordance with the present invention, the consumable material or particles 53 from the toaster portion 16 are caused to drop through the chute or passage 51 prior to self-cleaning operation during which such consumable material including bread or crust particles are desintegrated due to relatively high temperature heating in a range between 850° F. and 950° F. for example.

Illumination of the oven compartment 30 is provided from a lamp means 60 electrically energizable when the oven door means 25 is opened. A suitable door switch is provided for such electrical lamp energization.

A blower means 61 including a fan or impeller blade structure 62 located in an opening 63 of an inner rear wall 64 is operable electrically to draw outside air into the combination domestic appliance through suitable lanced out openings 65. A plurality of slots 66 in the insulation liner means structure as well as ceramic spacers (not shown) also serve to minimize heat flow or transfer between the oven liner means and oven support structure. It is noted that the oven door means 25 must be closed and latched during the electric self-cleaning oven operation and simultaneously the pivotally movable insulation segment 47 also closes off the oven liner means chute or passage 51 to the toaster portion as described previously. The range or combination domestic appliance 10 illustrated in the drawings also includes a catalytic oxidizing unit 70 for an electric self-cleaning oven means in accordance with a copending disclosure of S.N. 441,759—Allen et al., filed Mar. 22, 1965.

An automatic ejecting means for the toaster portion is disclosed by a Patent 2,361,446, Anderson, dated Oct. 31, 1944. Thus separate controls for toaster operation as to manual operation thereof are not shown since the toaster portion preferably will include automatic ejection mechanism. Suitable knob means 72 are provided for cooking and/or other electrical control of the range means on a console portion. The control knobs 72 are for the four surface cooking units 12 on the cooking top portion 11 of the range. An oven cooking thermostat means 74 as well as a tenderizing control means 75 has been shown on such a console in FIGURE 1. A broiling control means 76 is illustrated as is a clock and timer means 78.

Reference is made to a Patent 2,224,945—Ames, issued Dec. 17, 1940, concerning further disclosure of self-cleaning electric cooking apparatus per se. The combination toaster and self-cleaning oven means in accordance with the present invention is particularly advantageous in kitchens where space is at a premium such that the combination domestic appliance 10 serves multiple purposes. The crumbs and/or particles disintegrate during high temperature oven cleaning cycle operation. The push-pull mechanism is operable only when the oven door means 25 is opened and must be in a closed position for simultaneously properly positioning the insulated corner segment 47 when the oven door means is closed. The toaster portion as shown in FIGURE 1 has a top-central location though it is to be understood that the toaster portion also is adapted for location laterally to one side as represented in disclosure of a copending application Ser. No. 494,598, filed concurrently herewith and belonging to the assignee of the present invention on a combination waffle-maker and/or toaster and self-cleaning oven means. It is to be understood that the push-pull actuator or plunger means 23 also can be provided with a rack and pinion interengagement with the louvered bottom portion of the toaster as well as a gear or segmented toothed member carried by shaft 46 of the insulation segment 47. The combination toaster and self-cleaning oven means in accordance with the present invention has advantage also to lessen work in maintenance and cleaning of added kitchen appliance structures. It is noted that the toaster portion 16 is located adjacent to the insulated oven liner means and that the cooperation of the step 49 with the abutment 50 assures closure of the liner means during oven operation so that unwanted escape of heat is entirely avoided.

While the embodiments of the present invention as herein disclosed constitute preferred forms, it is to be understood that other forms might be adopted.

What is claimed is as follows:

1. A combination domestic appliance, comprising, an electric self-cleaning oven means having an insulated oven wall portion, an electric toaster portion having predetermined mounting to one side of said oven wall portion, and a movable insulated segment of said oven wall portion through which consumable material passes from said toaster portion into said electric self-cleaning oven means subject to closed positioning of said segment during high temperature cleaning operation so that the toaster portion consumable material is also disintegrated.

2. The combination domestic appliance of claim 1 wherein said movable segment is pivotally journalled in a rear upper corner of said electric self-cleaning oven means and an actuator means is provided for shift of positioning of said insulated segment of said oven wall portion.

3. The combination domestic appliance of claim 2 wherein said actuator means has a push-pull knob end located inwardly of peripheral edging of oven door means, said knob end and actuator means having positioning and connection with said insulated segment being in a closed-passage location when said oven door means is closed.

4. The combination domestic appliance of claim 3 wherein a recessing is provided in oven structure for positioning of said knob end of said actuator means and an oven door latch means secure said oven door means in a latched position for safety during high temperature electric self-cleaning oven operation in a range between 850° F. and 950° F.

5. The combination domestic appliance of claim 2 wherein said actuator means also has pivotal connection to bottom louver means of said electric toaster portion which are movable thereby simultaneously with pivotal movement of said insulated segment of said oven wall portion.

6. The combination domestic appliance of claim 5 wherein said louver means and said insulated segment collectively define a chute through which the consumable materials such as bread crumbs, crust and the like pass by gravitational force from said electric toaster portion into said electric self-cleaning oven means.

7. The combination domestic appliance of claim 6 wherein said insulated segment has a rigid lever arm projecting radially from pivotal axis thereof to said actuator means and has an arcuate surfacing having a step-like abutment located to complement said oven wall portion.

8. The combination of claim 7 wherein said self-cleaning oven means also has a rotisserie and broiler heating element therein located forwardly of said chute from said electric toaster portion.

9. In combination, an electric toaster portion having electrically energizable heating elements to one side of toaster access openings, and an electric range including a cooking top with burner openings as well as built-in toaster access openings, said electric range also including an electric self-cleaning oven portion with insulated walls and oven door means movably mounted on one side thereof, and a shiftable means which effects opening of passage between said electric toaster portion and said electric self-cleaning oven portion and permits drop of consumable material exemplified by bread crumbs, crust and the like into said electric self-cleaning oven portion.

10. The combination of claim 9 wherein said shiftable means includes connection both to pivotal toaster louver means and to pivotal segmentation of insulated walls of said electric self-cleaning oven portion.

11. The combination of claim 10 wherein said electric range has a control console to one side of said electric toaster portion openings and an oven door latch lever as well as a selector project from the control console in readily accessible location to effect high temperature electric self-cleaning oven operation in which such consumable material as crumbs, bread particles and burned crust from said electric toaster portion will be reduced into a disintegrating ash.

12. The combination of claim 10 wherein said pivotal toaster louver means and pivotal segmentation have push-pull actuator connection thereto with a knob end thereof necessarily being retracted into recessing to one side of oven door peripheral edging during high temperature electric self-cleaning oven operation.

13. A built-in electric toaster portion in combination with an electrical self-cleaning oven means, comprising, housing structure in a unit having external access opening for said toaster portion and internal movable toaster bottom including movable segmentation of insulated oven liner means such that a temporary displacement of said segmentation permits consumable materials such as crumbs, bread particles and burned crust from said electric toaster portion to drop into said electric self-cleaning oven means operable to reduce the consumable material into a disintegrating ash.

14. A combination toaster and self-cleaning oven means, comprising, an insulated oven liner portion having a movable segmentation located below said toaster, and a remote-control linkage that effects segmentation movement and bottom opening of the toaster to permit drop of consumable material as crumbs, bread crust and particles into said self-cleaning oven means electrically energizable to clean and reduce the consumable material into a disintegrating ash at high temperature.

15. The combination of claim 14 wherein said insulated oven liner portion and said movable segmentation thereof complement each other though collectively a chute is formed thereby temporarily.

16. The combination of claim 14 wherein said toaster has a top center and rear location on a cooking top also provided therewith.

17. The combination of claim 14 wherein said toaster has multi-slot access opening above built-in heater elements and above said movable segmentation.

18. The combination of claim 14 wherein said segmentation is supplemented by a pair of centrally journalled louver means each having a rigid link journalled at a free end thereof to said linkage and said segmentation is also pivotally secured to said linkage.

19. The combination of claim 18 wherein a lever with a lost motion slot is pivotally attached to said linkage.

20. A combination domestic appliance, comprising, cooking range structure including a self-cleaning oven means having an insulated oven wall portion, an auxiliary cooking means added to the range structure, and communication-forming means between said auxiliary cooking means and said self-cleaning oven means, said communication-forming means including a passage selectively opened and closed for transfer of consumable material from said auxiliary cooking means into said self-cleaning oven means whereby said consumable material is subject to degradation and disintegration of the consumable material in said self-cleaning oven means.

References Cited

UNITED STATES PATENTS

| 1,989,933 | 2/1935 | Kahn | 126—19 |
| 2,247,626 | 7/1941 | Ames | 219—391 |
| 2,504,445 | 4/1950 | Pavnica | 99—331 |
| 2,617,008 | 11/1952 | Ames | 219—395 |

FOREIGN PATENTS

| 1,376,149 | 9/1964 | France. | |

BILLY J. WILHITE, *Primary Examiner.*